Patented June 30, 1931

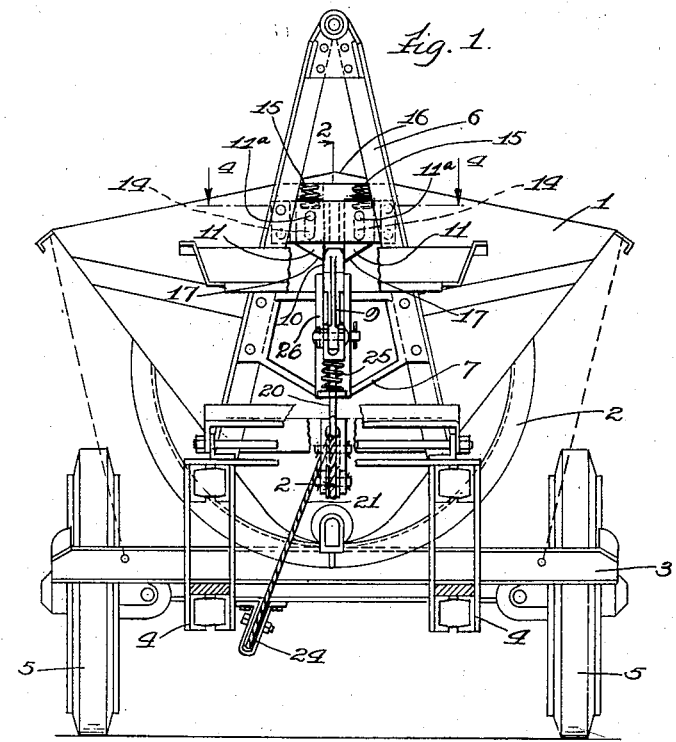

1,811,995

UNITED STATES PATENT OFFICE

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN

AUTOMATIC LOCK FOR TILTING BODIES

Application filed September 7, 1926. Serial No. 133,791.

This invention relates to a vehicle of the type having a body mounted for rocking or tilting to discharge its load, and its object is to provide means for locking the body in its normal upright or load carrying position automatically when it is swung to that position after discharging its load. The invention consists in certain features and elements of construction as herein shown and described and as indicated by the claims.

In the drawings:—

Figure 1 is a somewhat diagrammatic end view of a vehicle and its tilting hopper body fitted with a locking device embodying this invention.

Figure 2 is a vertical detail section of the locking members taken as indicated at line 2—2, on Figure 1.

Figure 3 is a sectional view similar to Figure 2, but showing the lock in released position.

Figure 4 is a detail plan section taken as indicated at line 4—4, on Figure 1.

In the vehicle chosen for illustration, an upwardly open body, 1, of the hopper type is provided with rockers, 2, mounted for limited rolling movement on cross rails, 3, which are supported on the drop frame, 4, of the vehicle. The position of the wheels is indicated at 5. Extending upwardly at each end of the frame is shown a triangular structure or A-frame, 6, which is provided primarily for purposes independent of this invention, but which serves conveniently as a mount for the locking device about to be described.

This A-frame, 6, includes a transversely extending casting, 7, upon which there is fulcrumed an arm, 9, whose terminal portion, 10, serves as a locking abutment. On the end wall of the body, 1, I provide a pair of latch members, 11, 11, which are guided for limited vertical sliding movement in a housing, 12, which may be secured by rivets, 13, to the body, 1, as indicated in Figure 4, and which includes a cover plate, 12ª, positioned in a plane just back of the A-frame, 6. The vertical range of the latch bolts, 11, is limited by pins, 11ª, engaging vertical slots, 14, in said bolts, and the bolts are thrust normally toward their lower limits by springs, 15, pocketed in the upper ends of the bolts and reacting against an overhanging flange, 16, of the housing, 12. The lower ends of the latch bolts, 11, are beveled oppositely, with respect to each other, as shown at 17.

Normally, as illustrated in Figure 1, the abutment, 10, is engaged between the opposed vertical faces of the latch bolts, 11, and since the arm, 9, of which the abutment, 10, is a part, is fulcrumed on the frame, 6, which is rigid with the main frame of the vehicle, while the latch bolts, 11, are mounted on the body, 1, this engagement of the abutment, 10, between the bolts serves to hold the body fixed in upright position. To release the lock so that the body may be rolled to either side for discharging its load, the abutment, 10, may be withdrawn from between the bolts, 11, by rocking the arm, 9, about its fulcrum, 8. The arm, 9, is a part of a bell-crank whose other arm, 19, extends horizontally and is connected by a link, 20, with a cable, 21, shown passing around idler pulleys, 22, 23 and 24, for connection with any suitable actuating means for exerting a pull on the cable, 21, and thus drawing the link, 20, downwardly and rocking the bell-crank to the position shown in Figure 3. Such actuating mechanism for example is illustrated in my Patent No. 1,716,877, granted June 11, 1929, wherein locking devices are provided at both ends of the body and are connected by linkage for simultaneous operation, at the middle of the vehicle. A spring, 25, yieldingly opposes this movement and tends to return the abutment to its normal position in the plane of the latch bolts, 11, as soon as the tension on the cable, 21, is released. But as long as the abutment, 10, is held out of the plane of the bolts, 11, the body, 1, is free to be rocked to dumping position.

When the load has been discharged and the body, 1, is rolled back to its upright position, the cable, 21, will have been first released so that the abutment, 10, will stand in position for encounter with the beveled face, 17, of one of the bolts, 11. Said beveled face will operate as a cam to force the bolt, 11, upward, compressing its spring, 15, and allowing the bolt to ride over the end of the abutment, 10. The other bolt, 11, however, will encounter the abutment, 10, with its vertical face which will arrest the movement of the body, 1, just at the instant when the first bolt, 11, has passed over the end of the abutment, 10, so that it can be snapped downwardly by its spring, 15, to engage the other side of the abutment, 10, with its vertical face. Thus the abutment, 10, will be again embraced between the two latch bolts, 11, and the body will be firmly locked in upright position. The vertical face of the one latch bolt, 11, acting as a stop against the abutment, 10, insures that the body will be arrested in exactly the proper position for the final locking, and thus relieves the operator of any particular care in bringing the body to its central upright position. In other words, the locking device operates automatically, both to insure registration of the parts, and to lock them when they are thus registered.

To avoid loading the pivot, 8, with the pressure which may be exerted against the sides of the abutment, 10, by the opposing faces of the latch bolts, 11, the abutment is mounted between fixed cheeks, 26, which also serve as guides for its swinging movement of withdrawal.

I claim:—

1. In combination with a vehicle frame and a tiltable body mounted thereon, means for locking the body to the frame comprising a pair of transversely spaced, vertically movable latches carried on the body, spring means normally urging said latches into operative position, a bell crank pivotally mounted on said frame for movement about a horizontal axis, and including an upwardly extending arm serving as an abutment adapted to normally engage between the opposing faces of said latches, the other arm of said bell crank extending in lateral direction, means connected to said laterally extending arm for moving the abutment out of operative position with said latches, and yielding means reacting against such movement of the bell crank.

2. In combination with a vehicle frame and a tiltable body mounted thereon, means for locking the body to the frame comprising a pair of transversely spaced, vertically movable latches carried on the body, spring means normally urging said latches into operative position, a movably mounted abutment carried on the frame and normally positioned for engagement between the opposing faces of said latches, means for yieldingly holding said abutment in such position, and means on the frame connected to the abutment and operable for withdrawing it from between the opposing faces of the latches by movement in a direction parallel to said opposing faces.

3. In combination with a vehicle frame and a tiltable body mounted thereon, means for locking the body to the frame comprising two pairs of transversely spaced, vertically movable latches carried on the body at opposite ends respectively, with spring means normally urging said latches into operative position, the frame having portions extending adjacent said latches at both ends of the body, and a movably mounted abutment carried on each of said frame portions and normally positioned for engagement between the opposing faces of said latches with yielding means normally holding said abutments at such position, together with means mounted on the frame operable from a point intermediate its ends and including connections to said abutments arranged for withdrawing them simultaneously from between the respective pairs of latches to permit tilting of the body on the frame.

In testimony whereof, I have hereunto set my hand at Edgerton, Wisconsin, this 3d day of September, 1926.

CHARLES G. CLEMENT.